US010446099B2

United States Patent
Gong

(10) Patent No.: US 10,446,099 B2
(45) Date of Patent: Oct. 15, 2019

(54) GATE ON ARRAY CIRCUIT AND LIQUID CRYSTAL DISPLAY

(71) Applicant: WUHAN CHINA STAR OPTOELECTRONICS TECHNOLOGY CO., LTD., Wuhan (CN)

(72) Inventor: Qiang Gong, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 306 days.

(21) Appl. No.: 15/124,302

(22) PCT Filed: Jun. 14, 2016

(86) PCT No.: PCT/CN2016/085645
§ 371 (c)(1),
(2) Date: Sep. 7, 2016

(87) PCT Pub. No.: WO2017/197685
PCT Pub. Date: Nov. 23, 2017

(65) Prior Publication Data
US 2018/0151141 A1 May 31, 2018

(30) Foreign Application Priority Data

May 18, 2016 (CN) .......................... 2016 1 0331136

(51) Int. Cl.
*G09G 3/36* (2006.01)
*G02F 1/1345* (2006.01)

(52) U.S. Cl.
CPC ....... *G09G 3/3677* (2013.01); *G02F 1/13454* (2013.01); *G09G 2310/021* (2013.01);
(Continued)

(58) Field of Classification Search
None
See application file for complete search history.

(56) References Cited

U.S. PATENT DOCUMENTS 8,232,941 B2 * 7/2012 Yeo ...................... G09G 3/3677
345/100
2014/0219412 A1 8/2014 Chien et al.
(Continued)

FOREIGN PATENT DOCUMENTS

CN 104318908 A 1/2015
CN 105427821 A 3/2016
(Continued)

*Primary Examiner* — Brian M Butcher
(74) *Attorney, Agent, or Firm* — Kirton McConkie; Evan R. Witt

(57) ABSTRACT

The present disclosure proposes a gate on array (GOA) circuit and a liquid crystal display. The stage GOA unit circuit at each stage includes a stage transmission signal enhancement module. The stage transmission signal enhancement module includes comprises a first input terminal fed with the first constant voltage, a second input terminal fed with the second constant voltage, and an output terminal electrically connected to the input terminal of the stage transmission signal output module. The stage transmission signal enhancement module is used to to output a first constant voltage or a second constant voltage to an input terminal of the stage transmission signal output module, according to the stage transmission signal by the previous stage GOA unit circuit.

13 Claims, 4 Drawing Sheets

(52) U.S. Cl.
CPC ............ *G09G 2310/0283* (2013.01); *G09G 2310/0286* (2013.01)

(56) References Cited

U.S. PATENT DOCUMENTS

| | | | |
|---|---|---|---|
| 2016/0189795 A1* | 6/2016 | Chen | G09G 3/20 377/70 |
| 2016/0307533 A1 | 10/2016 | Cao et al. | |

FOREIGN PATENT DOCUMENTS

| | | |
|---|---|---|
| CN | 105469754 A | 4/2016 |
| TW | 201433091 A | 8/2014 |

\* cited by examiner

GATE ON ARRAY CIRCUIT AND LIQUID CRYSTAL DISPLAY

BACKGROUND OF THE INVENTION

1. Field of the Invention

The current invention relates to liquid crystal display (LCD) technology, and more specifically, to a gate on array (GOA) circuit and LCD.

2. Description of the Prior Art

A GOA circuit makes use of the existing thin-film transistor liquid crystal display (TFT-LCD) array process to form a gate driver on a GOA substrate to realize a driving method of progressive scan. Comparing with traditional chip on film (COF) or chip on glass (COG) technology, GOA technology saves production cost and can skip the gate direction bonding step. It is extremely beneficial to increase production capacity and elevate the integration of the display facility.

Currently, most GOA circuit uses stage transmission signals to directly turn on the next stage GOA circuit. However, given that the stage transmission signal is attached with larger loading, delays occur quite often when there's characteristic deviation in the technology or device. Through stage transmission, these delays of stage transmission signals will be passed down stage by stage, thus affect the operation of the next stage GOA circuit, and the influence of the delays increases during the process of transmission.

SUMMARY OF THE INVENTION

The present invention provides a GOA circuit that can effectively solve delays that often occur because of higher loading carried by the stage transmission signal with the existing technology, therefore eliminate the technical problem of an increased influence of delays during the process of stage transmission.

In one aspect of the present invention, a gate on array (GOA) circuit comprises a plurality of stages of GOA unit circuits connected in cascade. The GOA unit circuit at each stage comprises: a forward and backward scanning control module to transmit the stage transmission signal of a previous stage GOA unit circuit to the stage transmission signal enhancement module; a stage transmission signal enhancement module to be controlled by the stage transmission signal by the previous stage GOA unit circuit to output a first constant voltage or a second constant voltage to an input terminal of the stage transmission signal output module. The first constant voltage is a constant low voltage, and the second constant voltage is a constant high voltage. A voltage level of the second constant voltage is smaller than that of the first constant voltage. The forward and backward scanning control module comprises an input terminal electrically connected to an output terminal of the previous stage GOA unit circuit, and an output terminal electrically connected to a control terminal of the stage transmission signal enhancement module. The stage transmission signal enhancement module comprises a first input terminal fed with the first constant voltage, a second input terminal fed with the second constant voltage, and an output terminal electrically connected to the input terminal of the stage transmission signal output module.

In at least one embodiment, the stage transmission signal enhancement module comprises: a first thin-film transistor (TFT), comprising a gate electrically connected to the output terminal of the forward and backward scanning control module, and a source fed with the first constant voltage; a second TFT, comprising a gate and source fed with the second constant voltage, and a drain electrically connected to the drain of the first TFT; a third TFT, comprising a gate electrically connected to the drain of the second TFT, and a source fed with the first constant voltage; and a fourth TFT, comprising a gate electrically connected to the gate of the first TFT, a source fed with the second constant voltage, and a drain electrically connected to the input terminal of the stage transmission signal output module and the drain of the third TFT.

In at least one embodiment, the first TFT, second TFT, third TFT and fourth TFT are N-type TFTs.

In at least one embodiment, the forward and backward scanning control module comprises: a fifth TFT, comprising a source fed with a stage transmission signal of the (N−1)th stage GOA unit circuit, a gate fed with a forward scan signal, and a drain connected to the gates of the first and fourth TFTs; and a sixth TFT, comprising a source fed with the stage transmission signal of the (N+1)th GOA unit circuit, a gate fed with a backward scan signal, and a drain connected to the gates of the first and fourth TFTs.

In at least one embodiment, the source of the fifth TFT feeds with a start signal of the circuit in the first stage GOA unit circuit.

In at least one embodiment, the source of the sixth TFT feeds with the start signal of the circuit in the last stage GOA unit circuit.

In another aspect of the present invention, a gate on array (GOA) circuit comprises a plurality of stages of GOA unit circuits connected in cascade. The GOA unit circuit at each stage comprises: a forward and backward scanning control module to transmit the stage transmission signal of a previous stage GOA unit circuit to the stage transmission signal enhancement module; a stage transmission signal enhancement module to be controlled by the stage transmission signal by the previous stage GOA unit circuit to output a first constant voltage or a second constant voltage to an input terminal of the stage transmission signal output module. The forward and backward scanning control module comprises an input terminal electrically connected to an output terminal of the previous stage GOA unit circuit, and an output terminal electrically connected to a control terminal of the stage transmission signal enhancement module. The stage transmission signal enhancement module comprises a first input terminal fed with the first constant voltage, a second input terminal fed with the second constant voltage, and an output terminal electrically connected to the input terminal of the stage transmission signal output module.

In at least one embodiment, the first constant voltage is a constant low voltage, and the second constant voltage is a constant high voltage.

In at least one embodiment, a voltage level of the second constant voltage is smaller than that of the first constant voltage.

In at least one embodiment, the stage transmission signal enhancement module comprises: a first thin-film transistor (TFT), comprising a gate electrically connected to the output terminal of the forward and backward scanning control module, and a source fed with the first constant voltage; a second TFT, comprising a gate and source fed with the second constant voltage, and a drain electrically connected to the drain of the first TFT; a third TFT, comprising a gate electrically connected to the drain of the second TFT, and a source fed with the first constant voltage; and a fourth TFT, comprising a gate electrically connected to the gate of the first TFT, a source fed with the second constant voltage, and a drain electrically connected to the input terminal of the stage transmission signal output module and the drain of the third TFT.

In at least one embodiment, the first TFT, second TFT, third TFT and fourth TFT are N-type TFTs.

In at least one embodiment, the forward and backward scanning control module comprises: a fifth TFT, comprising a source fed with a stage transmission signal of the (N−1)th stage GOA unit circuit, a gate fed with a forward scan signal, and a drain connected to the gates of the first and fourth TFTs; and a sixth TFT, comprising a source fed with the stage transmission signal of the (N+1)th GOA unit circuit, a gate fed with a backward scan signal, and a drain connected to the gates of the first and fourth TFTs.

In at least one embodiment, the source of the fifth TFT feeds with a start signal of the circuit in the first stage GOA unit circuit.

In at least one embodiment, the source of the sixth TFT feeds with the start signal of the circuit in the last stage GOA unit circuit.

In at least one embodiment, the stage transmission signal output module comprises an output unit, an output pull-down unit, a node input unit, a node control unit, a voltage stabilizer unit and a first capacitor. The output unit comprises: a ninth TFT, comprising a gate electrically connected to the first node, a source fed with a second clock signal, and a drain electrically connected to the output terminal of the Nth stage GOA unit circuit; and a second capacitor electrically connected to the first node and the output terminal of the Nth stage GOA unit circuit. The voltage stabilizer unit comprises an eighth TFT, a gate fed with the second constant voltage, a source electrically connected to a third node and a drain electrically connected to the first node. The output pull-down unit comprises a fourteenth TFT, a gate electrically connected to the second node, a source fed with the first constant voltage, and a drain electrically connected to the output terminal of the Nth stage GOA unit circuit. The node input unit comprises: a seventh TFT, comprising a gate fed with the first clock signal, a source electrically connected to the drains of the third and fourth TFTs, and a drain electrically connected to the third node; a twelfth TFT, comprising a gate electrically connected to the third node, a source fed with the first clock signal, and a drain electrically connected to the second node; a thirteenth TFT, comprising a gate fed with the first clock signal, a source fed with the second constant voltage, a drain electrically connected to the second node. The node control unit comprises: a tenth TFT, comprising a gate fed with the second clock signal, and a drain electrically connected to the third node; and an eleventh TFT, comprising a gate electrically connected to the second node, a source fed with the first constant voltage, and a drain electrically connected to the source of the tenth TFT.

In still another aspect of the present invention, a liquid crystal display comprises a gate on array (GOA) circuit. The GOA circuit comprises a plurality of stages of GOA unit circuits connected in cascade. The GOA unit circuit at each stage comprises: a forward and backward scanning control module to transmit the stage transmission signal of a previous stage GOA unit circuit to the stage transmission signal enhancement module; a stage transmission signal enhancement module to be controlled by the stage transmission signal by the previous stage GOA unit circuit to output a first constant voltage or a second constant voltage to an input terminal of the stage transmission signal output module. The forward and backward scanning control module comprises an input terminal electrically connected to an output terminal of the previous stage GOA unit circuit, and an output terminal electrically connected to a control terminal of the stage transmission signal enhancement module. The stage transmission signal enhancement module comprises a first input terminal fed with the first constant voltage, a second input terminal fed with the second constant voltage, and an output terminal electrically connected to the input terminal of the stage transmission signal output module.

In at least one embodiment, the first constant voltage is a constant low voltage, and the second constant voltage is a constant high voltage.

In at least one embodiment, a voltage level of the second constant voltage is smaller than that of the first constant voltage.

In at least one embodiment, the stage transmission signal enhancement module comprises: a first thin-film transistor (TFT), comprising a gate electrically connected to the output terminal of the forward and backward scanning control module, and a source fed with the first constant voltage; a second TFT, comprising a gate and source fed with the second constant voltage, and a drain electrically connected to the drain of the first TFT; a third TFT, comprising a gate electrically connected to the drain of the second TFT, and a source fed with the first constant voltage; and a fourth TFT, comprising a gate electrically connected to the gate of the first TFT, a source fed with the second constant voltage, and a drain electrically connected to the input terminal of the stage transmission signal output module and the drain of the third TFT.

In at least one embodiment, the first TFT, second TFT, third TFT and fourth TFT are N-type TFTs.

The GOA circuit and the LCD of the present invention add a stage transmission signal enhancement module between the forward and backward scanning control module and the stage transmission signal output module, so that the delays will be lowered when the stage transmission signals pass through the stage transmission signal enhancement module. The driving ability will also be elevated, so that the influence of delays of the stage transmission signal on the next stage GOA circuit is effectively lowered.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

These and other objectives of the claimed invention will no doubt become obvious to those of ordinary skill in the art after reading the following detailed description of the preferred embodiment that is illustrated in the various figures and drawings.

Figure 1:
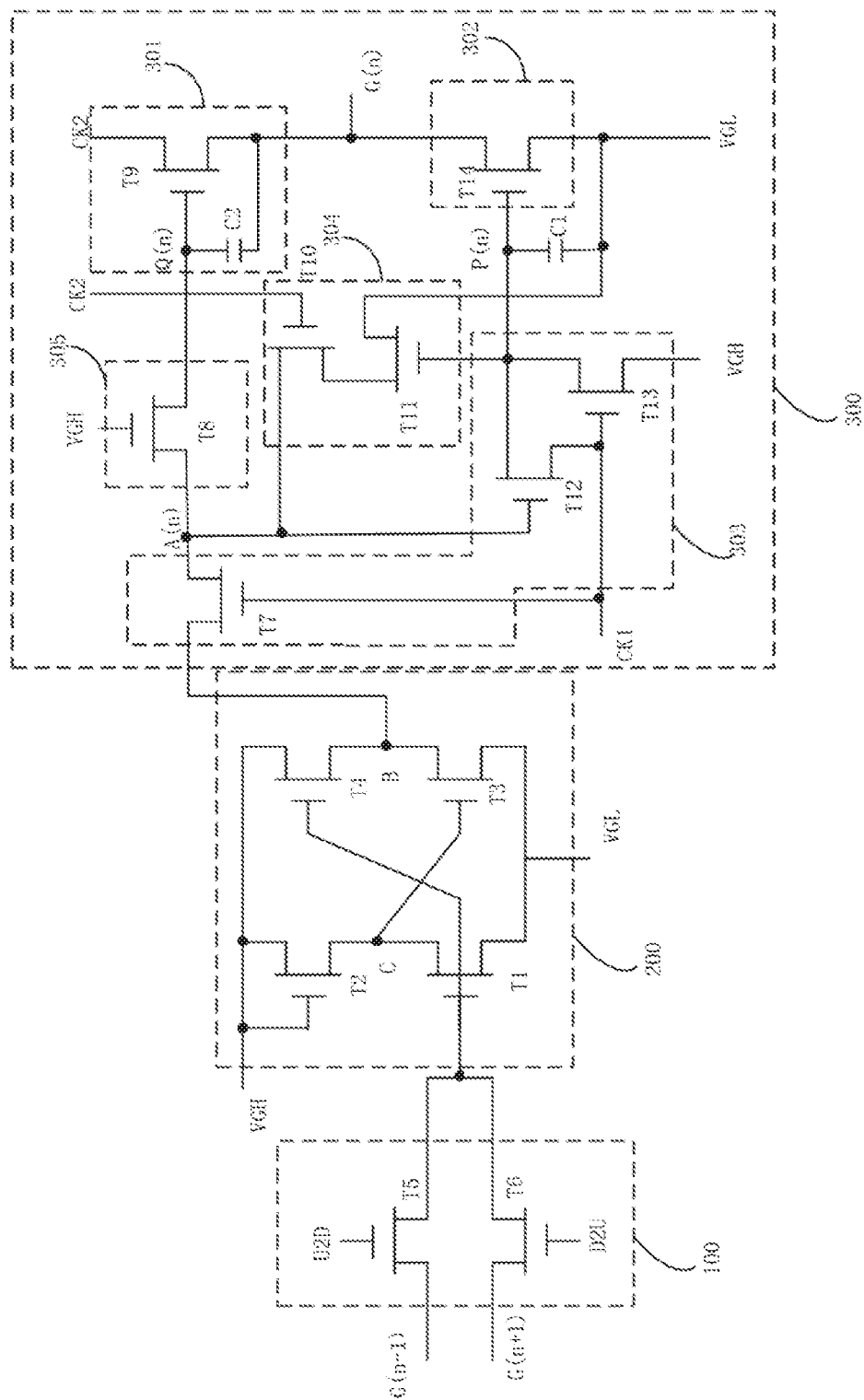
FIG. 1 is a circuit diagram of an Nth stage GOA unit circuit of a GOA circuit of the present invention.

Please refer to FIG. 1. FIG. 1 is a circuit diagram of the Nth stage GOA unit circuit of a GOA circuit of the present invention.

The GOA circuit of the present invention comprises a plurality of stages of GOA unit circuits connected in cascade. The GOA unit circuit at each stage comprises a forward and backward scanning control module 100, stage transmission signal enhancement module 200 and stage transmission signal output module 300.

Except the first stage GOA unit circuit and the last stage GOA unit circuit, the Nth (N being an integer) stage GOA unit circuit comprises:

a forward and backward scanning control module 100, comprising an input terminal electrically connected to an output terminal of the previous stage GOA unit circuit; and an output terminal electrically connected to a control terminal of the stage transmission signal enhancement module, so to transmit a stage transmission signal from the previous stage GOA unit circuit to the stage transmission signal enhancement module 200.

The stage transmission signal enhancement module 200 comprises a first input terminal fed with a first constant voltage, a second input terminal fed with a second constant voltage, and an output terminal electrically connected to an input terminal of a stage transmission signal output module 300, so to be controlled by the stage transmission signal of the previous stage GOA unit circuit to output the first or the second constant voltage to an input terminal of the stage transmission signal output module 300.

The first constant voltage is a constant low voltage VGL. The second constant voltage is a constant high voltage VGH.

A voltage level of the second constant voltage is smaller than that of the first constant voltage.

The stage transmission signal enhancement module 200 comprises a first TFT T1, a second TFT T2, a third TFT T3, and a fourth TFT T4.

The first TFT T1 comprises a gate electrically connected to the output terminal of the forward and backward scanning control module 100, a source fed with the first constant voltage, and a drain electrically connected to a drain of the second TFT T2.

The second TFT T2 comprises a gate and a source fed with the second constant voltage.

The third TFT T3 comprises a gate electrically connected to the drain of the second TFT T2, a source fed with the first constant voltage, and a drain electrically connected to a drain of the fourth TFT T4.

The fourth TFT T4 comprises a gate electrically connected to the gate of the first TFT T1, a source fed with the second constant voltage, and a drain electrically connected to the input terminal of the stage transmission signal output module 300.

The first TFT T1, second TFT T2, third TFT T3 and fourth TFT T4 are N-type TFTs.

The forward and backward scanning control module comprises a fifth TFT T5 and a sixth TFT T6.

The fifth TFT T5 comprises a source fed with a stage transmission signal of a (N−1)th stage GOA unit, a gate fed with a forward scanning signal U2D, a drain connected to the gates of the first TFT T1 and fourth TFT T4.

The sixth TFT T6 comprises a source fed with a stage transmission signal of a (N+1)th stage GOA unit, a gate fed with a backward scanning signal D2U, a drain connected to the gates of the first TFT T1 and fourth TFT T4.

Alternatively, when the fifth TFT T5 and the sixth TFT T6 are N-type TFTs, during a forward scan, the forward scanning signal U2D is at a high voltage level and the backward scanning signal D2U is at a low voltage level; during a backward scan, the forward scanning signal U2D is at the low voltage level and the backward scanning signal D2U is at the high voltage level.

Alternatively, when the fifth TFT T5 and the sixth TFT T6 are P-type TFTs, during a forward scan, the forward scanning signal U2D is at a low voltage level and the backward scanning signal D2U is at a high voltage level; during a backward scan, the forward scanning signal U2D is at the high voltage level and the backward scanning signal D2U is at the low voltage level.

The stage transmission signal output module 300 comprises an output unit 301, an output pull-down unit 302, and a node input unit 303, a node control unit 304, a voltage stabilizer unit 305 and a first capacitor C1.

The output unit 301 comprises a ninth TFT T9, comprising a gate electrically connected to a first node Q(n), a source fed with a second clock signal CK2, a drain electrically connected to the output terminal of the Nth stage GOA unit circuit, and a second capacitor C2, with one end electrically connected to the first node Q(n) and another end electrically connected to the output terminal G(n) of the Nth stage GOA unit circuit.

The voltage stabilizer unit 305 comprises an eighth TFT T8, comprising a gate fed with the second constant voltage, a source electrically connected to a third node A(n), and a drain electrically connected to the first node Q(n).

The output pull-down unit 302 comprises a fourteenth TFT T14, comprising a gate electrically connected to a second node P(n), a source fed with the first constant voltage, a drain electrically connected to the output terminal G(n) of the Nth stage GOA unit circuit.

The node input unit comprises a seventh TFT T7, a twelfth TFT T12 and a thirteenth TFT T13. The seventh TFT T7 comprises a source electrically connected to the drain of the third TFT T3 and the drain of the fourth TFT T4; a gate, along with the source of the twelfth TFT 12 and the gate of the thirteenth TFT T13, fed with the first clock signal CK1; a drain, along with the gate of the twelfth TFT T12, electrically connected to the third node A(n). The drain of the twelfth TFT T12 and the drain of the thirteenth TFT T13 electrically connect to the second node P(n). The source of the thirteenth TFT T13 fed with the second constant voltage.

The node control unit 304 comprises a tenth TFT T10 and an eleventh TFT T11. The eleventh TFT T11 comprises a gate electrically connected to the second node P(n), a source fed with the first constant voltage, a drain electrically connected to the source of the tenth TFT T10. The tenth TFT10 comprises a gate fed with the second clock signal CK2, and a drain electrically connected to the third node A(n).

The first clock signal CK1 and the second clock signal CK2 have opposite phases.

Figure 2:
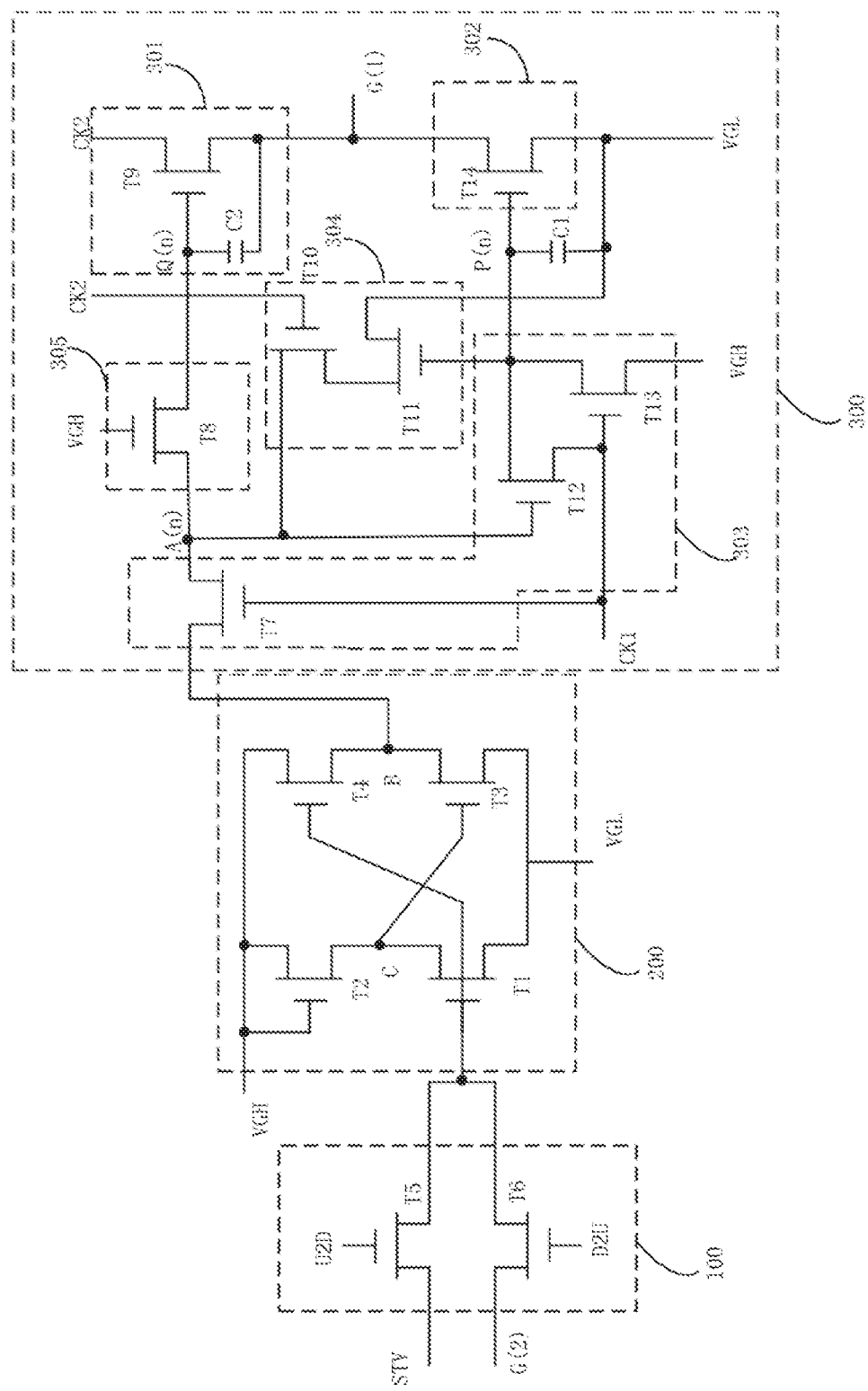
FIG. 2 is a circuit diagram of a first stage GOA unit circuit of a GOA circuit of the present invention.

Please refer to FIG. 2 for specifics. In the first stage GOA unit circuit, the fifth TFT T5 comprises a source fed with a start signal STV of the circuit, a gate fed with the forward scanning signal U2D, and a drain connected to the gate of the TFT T1 and the gate of the fourth TFT T4.

Figure 3:
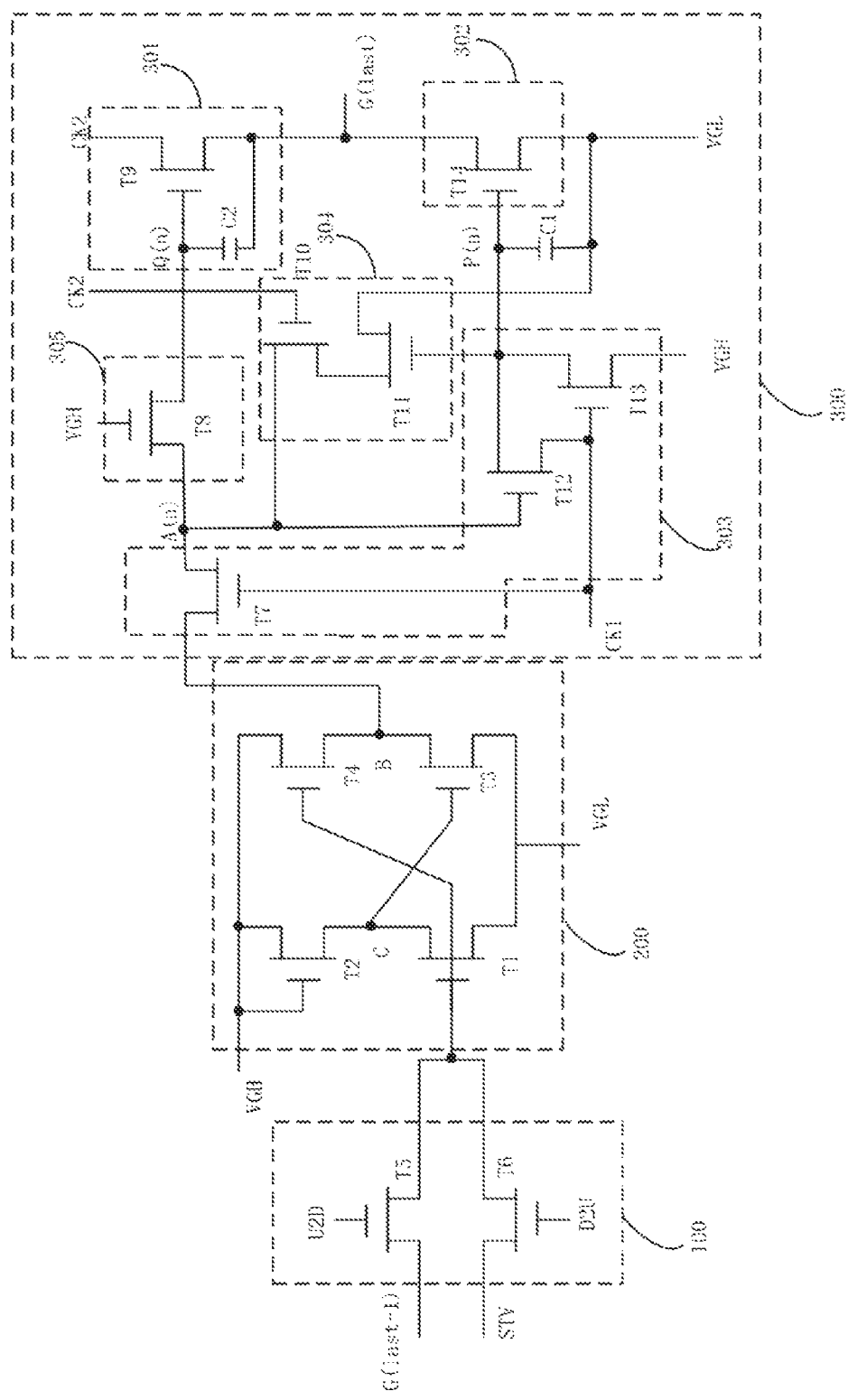
FIG. 3 is a circuit diagram of the last stage GOA unit circuit of a GOA circuit of the present invention.

Please refer to FIG. 3. In the last stage GOA unit circuit, the sixth TFT T6 comprises a source fed with the start signal STV of the circuit, a gate fed with the backward scanning signal D2U, and a drain connected to the gate of the first TFT T1 and the gate of the fourth TFT T4.

Figure 4:
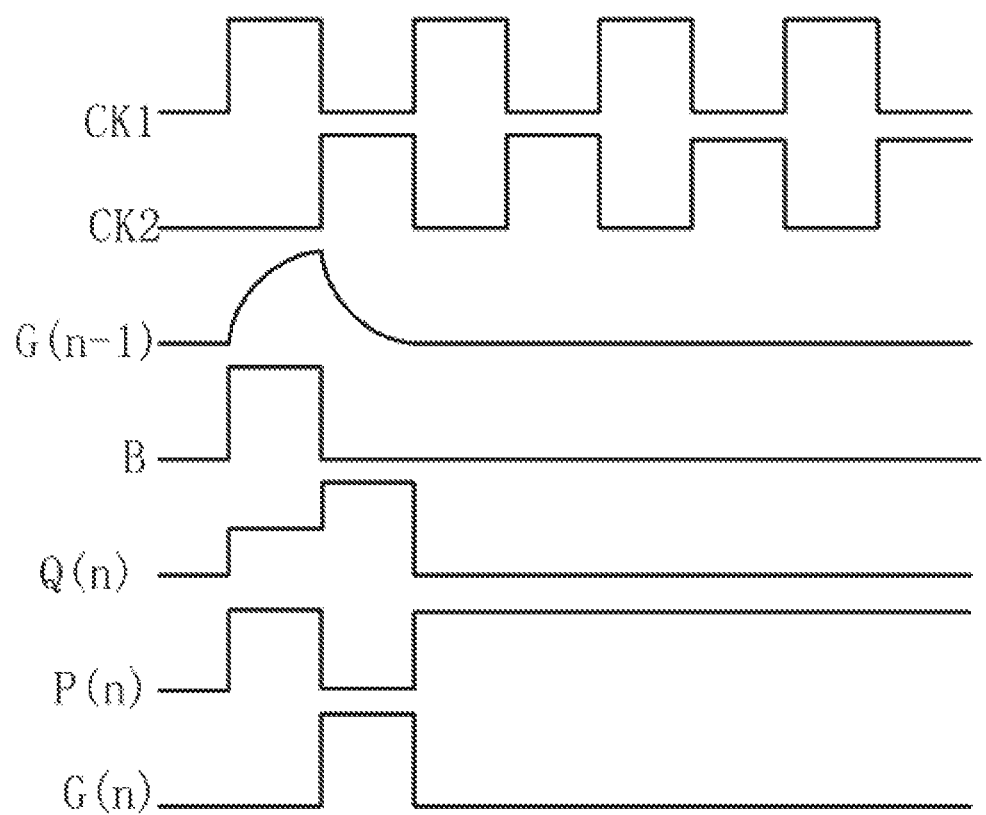
FIG. 4 shows waveforms of input signals and key nodes.

Please refer to FIG. 1 and FIG. 4. All TFTs shown in FIG. 1 are N-type TFTs. The following text describes the operation of a forward scan of the GOA circuit of the present invention as an example. The start signal STV of the circuit triggers the first stage GOA circuit, which drives by scanning stage by stage. When the scanning proceeds to the Nth stage GOA unit circuit, the stage transmission signal G(n−1) of the previous stage, the (N−1)th stage GOA unit circuit, is at a high voltage level. When the forward scanning signal is at the high voltage level and the backward scanning signal is at a low voltage level, the fifth TFT T5 is turned on and the sixth TFT T6 is turned off, so that the stage transmission signal G(n−1) is transmitted to the stage transmission signal enhancement module.

More specifically, the first TFT T1 and second TFT T2 are turned on at this moment. The first constant voltage is a constant low voltage, and the second constant voltage is a constant high voltage. The level of the second constant voltage is lower than that of the first constant voltage, so that a C point is at a low voltage level. Thus, the third TFT T3 is turned off and the fourth TFT T4 is turned on, and the output terminal B of the stage transmission signal enhancement module is pulled up by the second constant voltage to a high voltage level. When the stage transmission signal G(n−1) of the previous stage, the (N−1)th stage GOA unit circuit, is at a low voltage level, the fourth TFT T4 is turned off. However, because the second TFT T2 is influenced by the second constant voltage and maintained at a turned-on status, the C point is at a high voltage level, so that the third TFT T3 is turned on and the output terminal B of the stage transmission signal enhancement module is pulled down by the first constant voltage to a low voltage level.

Through the stage transmission signal enhancement module 200, the stage transmission signal of the previous stage GOA unit circuit serves as a control signal, so to transmit the constant voltage to the stage transmission signal output module 300 and enhance the signal.

Then, when the first clock signal CK1 is at a high voltage level, the second clock signal CK2 is at a low voltage level, the seventh TFT T7 and the eighth TFT T8 are turned on and the first node Q(n) is pulled up to a high voltage level, charging the second capacitor C2. When the first clock signal CK1 is at the high voltage level and the second clock signal CK2 is at the low voltage level, the thirteenth TFT T13 and the twelfth TFT T12 is turned on and the second node P(n) is pulled up to a high voltage level. At this moment, the ninth TFT T9 and the fourteenth TFT T14 are turned on, thus the output terminal G(n) of the Nth stage GOA unit circuit is pulled down to a low voltage level.

Then, when the first clock signal CK1 is at a low voltage level, and the second clock signal CK2 is at a high voltage level, the seventh TFT T7 is turned off and the first node Q(n) maintains at a high voltage level through the capacitor C2, so that the ninth TFT T9 is turned on. When the first clock signal CK1 is at a low voltage level and the second clock signal CK2 is at a high voltage level, the thirteenth TFT T13 is turned on and the first clock signal CK1 pulls down the P(n), so that the fourteenth TFT T14 is turned off. The source of the ninth TFT T9 feeds with the second clock signal CK2, thus the output terminal G(n) of the Nth stage GOA unit circuit is pulled up to a high voltage level by the second clock signal CK2.

When the P node is at a high voltage level, and the second clock signal CK2 is at a high voltage level, the eleventh TFT T11 and tenth TFT T10 and the eighth TFT T8 are turned on, and the first node Q(n) is pulled down by the constant low voltage.

The GOA circuit and the LCD of the present invention add a stage transmission signal enhancement module between the forward and backward scanning control module and the stage transmission signal output module, so that the delays will be lowered when the stage transmission signals pass through the stage transmission signal enhancement module. The driving ability will also be elevated, so that the influence of delays of the stage transmission signal on the next stage GOA circuit is effectively lowered.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A gate on array (GOA) circuit, comprising a plurality of stages of GOA unit circuits connected in cascade, with the GOA unit circuit at each stage comprising:
   a forward and backward scanning control module to transmit a stage transmission signal of a previous stage GOA unit circuit to a stage transmission signal enhancement module;
   the stage transmission signal enhancement module to be controlled by the stage transmission signal by the previous stage GOA unit circuit to output a first constant voltage or a second constant voltage to an input terminal of a stage transmission signal output module;
   wherein the first constant voltage is a constant low voltage, and the second constant voltage is a constant high voltage, and a voltage level of the second constant voltage is smaller than that of the first constant voltage;
   wherein the forward and backward scanning control module comprises an input terminal electrically connected to an output terminal of the previous stage GOA unit circuit, and an output terminal electrically connected to a control terminal of the stage transmission signal enhancement module; the stage transmission signal enhancement module comprises a first input terminal fed with the first constant voltage, a second input terminal fed with the second constant voltage, and an output terminal electrically connected to the input terminal of the stage transmission signal output module;
   wherein the stage transmission signal enhancement module comprises:
   a first thin-film transistor (TFT), comprising a gate electrically connected to the output terminal of the forward and backward scanning control module, and a source fed with the first constant voltage;
   a second TFT, comprising a gate and source fed with the second constant voltage, and a drain electrically connected to the drain of the first TFT;
   a third TFT, comprising a gate electrically connected to the drain of the second TFT, and a source fed with the first constant voltage; and
   a fourth TFT, comprising a gate electrically connected to the gate of the first TFT, a source fed with the second constant voltage, and a drain electrically connected to the input terminal of the stage transmission signal output module and the drain of the third TFT.

2. The GOA circuit of claim 1, wherein the first TFT, second TFT, third TFT and fourth TFT are N-type TFTs.

3. The GOA circuit of claim 2, wherein the forward and backward scanning control module comprises:
   a fifth TFT, comprising a source fed with a stage transmission signal of an (N−1)th stage GOA unit circuit, a gate fed with a forward scan signal, and a drain connected to the gates of the first and fourth TFTs, where N is a positive integer; and a sixth TFT, comprising a source fed with the stage transmission signal of an (N+1)th GOA unit circuit, a gate fed with a backward scan signal, and a drain connected to the gates of the first and fourth TFTs.

4. The GOA circuit of claim 3, wherein the source of the fifth TFT feeds with a start signal of the circuit in the first stage GOA unit circuit.

5. The GOA circuit of claim 3, wherein the source of the sixth TFT feeds with the start signal of the circuit in the last stage GOA unit circuit.

6. A gate on array (GOA) circuit, comprising a plurality of stages of GOA unit circuits connected in cascade, with the GOA unit circuit at each stage comprising:

a forward and backward scanning control module to transmit the stage transmission signal of a previous stage GOA unit circuit to the stage transmission signal enhancement module;

a stage transmission signal enhancement module to be controlled by the stage transmission signal by the previous stage GOA unit circuit to output a first constant voltage or a second constant voltage to an input terminal of a stage transmission signal output module;

wherein the forward and backward scanning control module comprises an input terminal electrically connected to an output terminal of the previous stage GOA unit circuit, and an output terminal electrically connected to a control terminal of the stage transmission signal enhancement module; the stage transmission signal enhancement module comprises a first input terminal fed with the first constant voltage, a second input terminal fed with the second constant voltage, and an output terminal electrically connected to the input terminal of the stage transmission signal output module, wherein the stage transmission signal enhancement module comprises:

a first thin-film transistor (TFT), comprising a gate electrically connected to the output terminal of the forward and backward scanning control module, and a source fed with the first constant voltage;

a second TFT, comprising a gate and source fed with the second constant voltage, and a drain electrically connected to the drain of the first TFT;

a third TFT, comprising a gate electrically connected to the drain of the second TFT, and a source fed with the first constant voltage; and a fourth TFT, comprising a gate electrically connected to the gate of the first TFT, a source fed with the second constant voltage, and a drain electrically connected to the input terminal of the stage transmission signal output module and the drain of the third TFT.

7. The GOA circuit of claim 6, wherein the first TFT, second TFT, third TFT and fourth TFT are N-type TFTs.

8. The GOA circuit of claim 7, wherein the forward and backward scanning control module comprises:

a fifth TFT, comprising a source fed with a stage transmission signal of an (N−1)th stage GOA unit circuit, a gate fed with a forward scan signal, and a drain connected to the gates of the first and fourth TFTs, where N is a positive integer; and a sixth TFT, comprising a source fed with the stage transmission signal of an (N+1)th GOA unit circuit, a gate fed with a backward scan signal, and a drain connected to the gates of the first and fourth TFTs.

9. The GOA circuit of claim 8, wherein the source of the fifth TFT feeds with a start signal of the circuit in the first stage GOA unit circuit.

10. The GOA circuit of claim 8, wherein the source of the sixth TFT feeds with the start signal of the circuit in the last stage GOA unit circuit.

11. The GOA circuit of claim 9, wherein the stage transmission signal output module comprises an output unit, an output pull-down unit, a node input unit, a node control unit, a voltage stabilizer unit and a first capacitor;

the output unit comprises:

a ninth TFT, comprising a gate electrically connected to the first node, a source fed with a second clock signal, and a drain electrically connected to the output terminal of an Nth stage GOA unit circuit; and a second capacitor electrically connected to the first node and the output terminal of the Nth stage GOA unit circuit;

the voltage stabilizer unit, comprising an eighth TFT, a gate fed with the second constant voltage, a source electrically connected to a third node and a drain electrically connected to the first node;

the output pull-down unit comprises a fourteenth TFT, a gate electrically connected to a second node, a source fed with the first constant voltage, and a drain electrically connected to the output terminal of the Nth stage GOA unit circuit;

the node input unit comprises:

a seventh TFT, comprising a gate fed with the first clock signal, a source electrically connected to the drains of the third and fourth TFTs, and a drain electrically connected to the third node;

a twelfth TFT, comprising a gate electrically connected to the third node, a source fed with the first clock signal, and a drain electrically connected to the second node;

a thirteenth TFT, comprising a gate fed with the first clock signal, a source fed with the second constant voltage, a drain electrically connected to the second node;

the node control unit comprises:

a tenth TFT, comprising a gate fed with the second clock signal, and a drain electrically connected to the third node; and an eleventh TFT, comprising a gate electrically connected to the second node, a source fed with the first constant voltage, and a drain electrically connected to the source of the tenth TFT.

12. A liquid crystal display, comprising a gate on array (GOA) circuit comprising a plurality of stages of GOA unit circuits connected in cascade, with the GOA unit circuit at each stage comprising:

a forward and backward scanning control module to transmit the stage transmission signal of a previous stage GOA unit circuit to the stage transmission signal enhancement module;

a stage transmission signal enhancement module to be controlled by the stage transmission signal by the previous stage GOA unit circuit to output a first constant voltage or a second constant voltage to an input terminal of a stage transmission signal output module;

wherein the forward and backward scanning control module comprises an input terminal electrically connected to an output terminal of the previous stage GOA unit circuit, and an output terminal electrically connected to a control terminal of the stage transmission signal enhancement module; the stage transmission signal enhancement module comprises a first input terminal fed with the first constant voltage, a second input terminal fed with the second constant voltage, and an output terminal electrically connected to the input terminal of the stage transmission signal output module, wherein the stage transmission signal enhancement module comprises:

a first thin-film transistor (TFT), comprising a gate electrically connected to the output terminal of the forward and backward scanning control module, and a source fed with the first constant voltage;

a second TFT, comprising a gate and source fed with the second constant voltage, and a drain electrically connected to the drain of the first TFT;

a third TFT, comprising a gate electrically connected to the drain of the second TFT, and a source fed with the first constant voltage; and a fourth TFT, comprising a gate electrically connected to the gate of the first TFT, a source fed with the second constant voltage, and a drain electrically connected to the input terminal of the stage transmission signal output module and the drain of the third TFT.

13. The liquid crystal display of claim 12, wherein the first TFT, second TFT, third TFT and fourth TFT are N-type TFTs.

* * * * *